US011736492B2

United States Patent
Lyons

(10) Patent No.: US 11,736,492 B2
(45) Date of Patent: *Aug. 22, 2023

(54) SIGNED CONTACT LISTS FOR USER AUTHENTICATION IN VIDEO CONFERENCES

(71) Applicant: Zoom Video Communications, Inc., San Jose, CA (US)

(72) Inventor: Karan Lyons, Los Angeles, CA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/585,720

(22) Filed: Jan. 27, 2022

(65) Prior Publication Data

US 2022/0377080 A1 Nov. 24, 2022

Related U.S. Application Data

(63) Continuation of application No. 17/327,265, filed on May 21, 2021, now Pat. No. 11,290,465.

(51) Int. Cl.
*H04L 9/40* (2022.01)
*H04L 9/32* (2006.01)
(Continued)

(52) U.S. Cl.
CPC .......... *H04L 63/102* (2013.01); *H04L 9/3247* (2013.01); *H04N 7/147* (2013.01); *H04N 7/15* (2013.01)

(58) Field of Classification Search
CPC .... H04L 9/40; H04L 9/32; H04N 7/14; H04N 7/147; H04N 7/15
(Continued)

(56) References Cited

U.S. PATENT DOCUMENTS 11,290,465 B1 3/2022 Lyons
2003/0070072 A1* 4/2003 Nassiri ................ H04L 9/3247
713/168
(Continued)

FOREIGN PATENT DOCUMENTS

WO WO-2020178752 A1 * 9/2020 ............ G06Q 10/00

OTHER PUBLICATIONS

GSM Association, GSM Floor 2 the Walbrook Building 25 Wallbrook London, XP040719626, Oct. 19, 2020.
(Continued)

*Primary Examiner* — Melur Ramakrishnaiah
(74) *Attorney, Agent, or Firm* — Kilpatrick Townsend & Stockton LLP

(57) ABSTRACT

One example method includes connecting, by a first client device associated with a user, to a video conference hosted by a video conference provider, the video conference having a plurality of participants; receiving participant information for each participant of the plurality of participants; generating, for one or more of the participants, an identity record corresponding to the respective participant, the identity record including video conference information, at least a portion of the participant information, and a cryptographic signature; appending, for each generated identity record, the respective identity record to a user contact list; and verifying at least one participant of the plurality of participants based on the user contact list.

20 Claims, 9 Drawing Sheets

(51) Int. Cl.
  *H04N 7/14*  (2006.01)
  *H04N 7/15*  (2006.01)
(58) Field of Classification Search
  USPC .............................................. 348/14.01–14.16
  See application file for complete search history.

(56) References Cited

U.S. PATENT DOCUMENTS

| | | | |
|---|---|---|---|
| 2005/0102502 A1* | 5/2005 | Sagen | H04L 9/3263 |
| | | | 379/202.01 |
| 2008/0117838 A1* | 5/2008 | Yee | H04N 7/15 |
| | | | 379/142.17 |
| 2015/0067500 A1 | 3/2015 | Lee et al. | |
| 2018/0218292 A1 | 8/2018 | Granbery | |
| 2019/0068570 A1 | 2/2019 | Ghafourifar et al. | |
| 2021/0258308 A1* | 8/2021 | Avetisov | H04L 9/3234 |
| 2022/0148111 A1* | 5/2022 | Wright | H04N 7/147 |

OTHER PUBLICATIONS

PCT/US2022/028543, "International Search Report and Written Opinion" dated Aug. 29, 2022, 11 pages.
U.S. Appl. No. 17/327,265, Notice of Allowance dated Nov. 24, 2021, 11 pages.

* cited by examiner

SIGNED CONTACT LISTS FOR USER AUTHENTICATION IN VIDEO CONFERENCES

CROSS-REFERENCE TO RELATED APPLICATIONS

This application is a continuation application of U.S. patent application Ser. No. 17/327,265, filed May 21, 2021, titled "Systems and Methods for Signed Contact Lists for User Authentication in Video Conferences," the entirety of which is hereby incorporated by reference.

FIELD

The present application generally relates to video conferencing and more specifically relates to systems and methods for signed contact lists for user authentication during video conferences.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for signed contact lists for user authentication in video conferences. One example method includes connecting, by a first client device associated with a user, to a video conference hosted by a video conference provider, the video conference having a plurality of participants; receiving participant information for each participant of the plurality of participants; generating, for one or more of the participants, an identity record corresponding to the respective participant, the identity record including video conference information, at least a portion of the participant information, and a cryptographic signature; appending, for each generated identity record, the respective identity record to a user contact list; and verifying at least one participant of the plurality of participants based on the user contact list.

One example system includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to connect, using the communications interface, to a main meeting of a video conference hosted by a video conference provider, the video conference having a plurality of participants, the system associated with a user; receive participant information for each participant of the plurality of participants; generate, for one or more participants, an identity record corresponding to the respective participant, the identity record including video conference information, at least a portion of the participant information, and a cryptographic signature; append, for each generated identity record, the respective identity record to a user contact list; and verify at least one participant of the plurality of participants based on the user contact list.

One example non-transitory computer-readable medium comprising processor-executable instructions configured to cause one or more processors to connect to a main meeting of a video conference hosted by a video conference provider, the video conference having a plurality of participants, the system associated with a user; receive participant information for each participant of the plurality of participants; generate, for one or more participants, an identity record corresponding to the respective participant, the identity record including video conference information, at least a portion of the participant information, and a cryptographic signature; append, for each generated identity record, the respective identity record to a user contact list; and verify at least one participant of the plurality of participants based on the user contact list.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
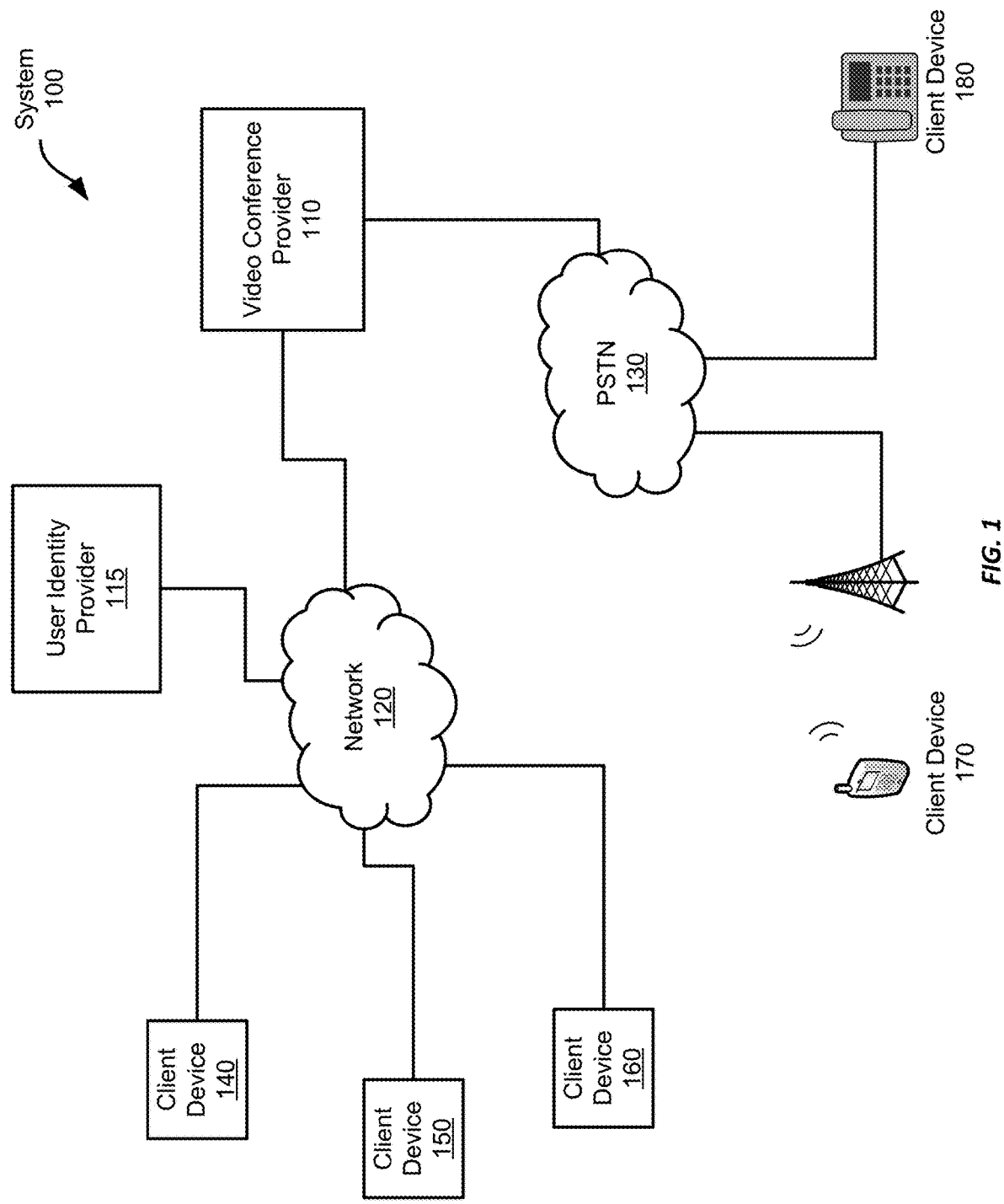
FIGS. 1-5 show example systems for signed contact lists for user authentication in video conferences.

Examples are described herein in the context of systems and methods for signed contact lists for user authentication in video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

People participate in video conferences for a wide variety of reasons, such as to keep in touch with family, conduct business, or manage groups or organizations. In some cases, participants in a video conference may wish to keep the contents of the video conference confidential and only available to certain authorized personnel. This can be done by encrypting audio and video that is streamed between participants to a video conference, which may prevent potential eavesdroppers from accessing the streamed audio and video. Without the necessary decryption information, accessing the encrypted audio and video can be prohibitively computationally difficult.

However, encryption only addresses some of the potential risks. For example, when creating a meeting to discuss confidential information, the host may only invite specific people that are authorized to access the confidential information to the meeting. In addition, the host may specify that the video and audio streams (or "multimedia streams") exchanged during the meeting are to be encrypted for all users. The host may even exclude the video conference provider that is facilitating the meeting from accessing the multimedia streams by employing end-to-end ("E2E") encryption, a scheme whereby only the participants to the meeting are provided with cryptographic keys needed to encrypt and decrypt the multimedia streams.

A weakness to encryption is if an unauthorized person impersonates an authorized participant and receives the cryptographic keys to decrypt the various multimedia streams. In large meetings, it is not uncommon that participants are not able to see video feeds from every other participant, and in some cases, not all participants may provide video streams. Thus, even if a user is being impersonated, it may not be apparent to other participants in the video conference.

To help prevent unauthorized persons from accessing or remaining in meetings, each participant invited to the meeting may be required to establish an electronic "identity," either with the video conference provider or with another trusted entity. The identity, such as a user account with the video conference provider, may be accessed by the corresponding user by providing a user identifier, e.g., an email address or username, and a password. Once the identity has been accessed, the video conference provider can authenticate the user. However, in some examples, not all participants may have accounts with a video conference provider, or even if the participant does have access, the other participants may wish additional assurance that the identity has not been compromised. To further help authenticate identities, systems and methods according to this disclosure employ a signed contact lists that can enable participants in a video conference to determine whether other participants in the video conference are who they say they are or whether they may be impersonators.

To illustrate how signed contact lists may help a person verify other participants in a video conference are not being impersonated, a user may execute video conferencing software to participate in various video conferences (or "meetings") facilitated by a video conference provider. During the meeting, the video conference software receives information about each of the other participants in the meeting, such as their name or other user identifier, client device information (e.g., a device's make and serial number), information about the participants' public cryptographic keys, a portion of their signature chain, etc. The user may also be presented with an option to select whether they can confirm that one or more participants in the meeting is authentic. The user may be able to determine this for some participants by recognizing their faces in video feeds or by recognizing their voices in audio feeds.

If the user recognizes a participant, they may select an option in a graphical user interface ("GUI") to indicate that they recognize the participant. Similarly, they may select a different option if a participant does not seem to be who they say they are. For other participants, e.g., for participants that the user may not know, the user may not select any options.

When a user selects the option indicating they recognize a participant, or that they do not recognize a participant, the video conference software logs the selection and, when the meeting has concluded, the video conference software modifies a contact list that it maintains for the user. The contact list tracks the participants that the user has encountered in meetings over time and keeps records for each participant in each meeting. These records are stored by the user's client device and then synchronized across any other of the user's authorized devices.

These records can include information to enable the user's client device to determine whether another participant in a meeting is known or may be an imposter. Such information may include the name or other user identifier of a participant, client device information, information from the participant's signature chain, etc. In addition, the record may include other information about the meeting where the user encountered the participant, such as whether the participant was removed from the meeting or whether the participant failed an authentication check. The user may then cryptographically sign each of these records to confirm its authenticity and store the records in a contact list, which itself may or may not be encrypted, e.g., using the user's cryptographic key-pair. As the user encounters more users, or re-encounters known users, the contact list becomes a reliable way for the user to confirm that participants in any given meeting are who they say they are.

For example, when the user joins a video conference, as discussed above, they receive information about other participants in the meeting. Based on the received information, the video conference software executed by the user's client device can search the user's contact list to identify one or more records associated with some or all of the other participants. The video conference software can then determine whether the received information from the other participants matches information in the contact list, conflicts with information in the contact list, does not correspond to a known user in the contact list, etc. If the video conference software can authenticate one or more of the other participants based on the contact list, it may present information in the GUI to indicate that the participant is known and authentic, while for any participants where the received information appears to conflict with information stored in the contact list, the video conference software can present information in the GUI to indicate that the participant may not be authentic. For any other participants, the video conference software can indicate the user is unknown.

If any participants may not be authentic, the user can then determine whether to try to verify the person's identity, such as by asking them to speak or to turn on their camera. Alternatively, the user can leave the meeting or end the meeting.

Such functionality may allow a user to ensure that participants in a video conference are who they appear to be without relying on the video conference provider or another participant to authenticate the other participants, which may or may not be trusted by the user. Thus, the user can be confident that the other participants in the meeting are who they say they are. This can ensure more secure video conferences, particularly if multiple different participants employ such functionality. Further, it can allow the user's client device to automatically flag participants for the user that may be imposters.

This illustrative example is given to introduce the reader to the general subject matter discussed herein and the disclosure is not limited to this example. The following sections describe various additional non-limiting examples and examples of systems and methods for signed contact lists for user authentication in video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
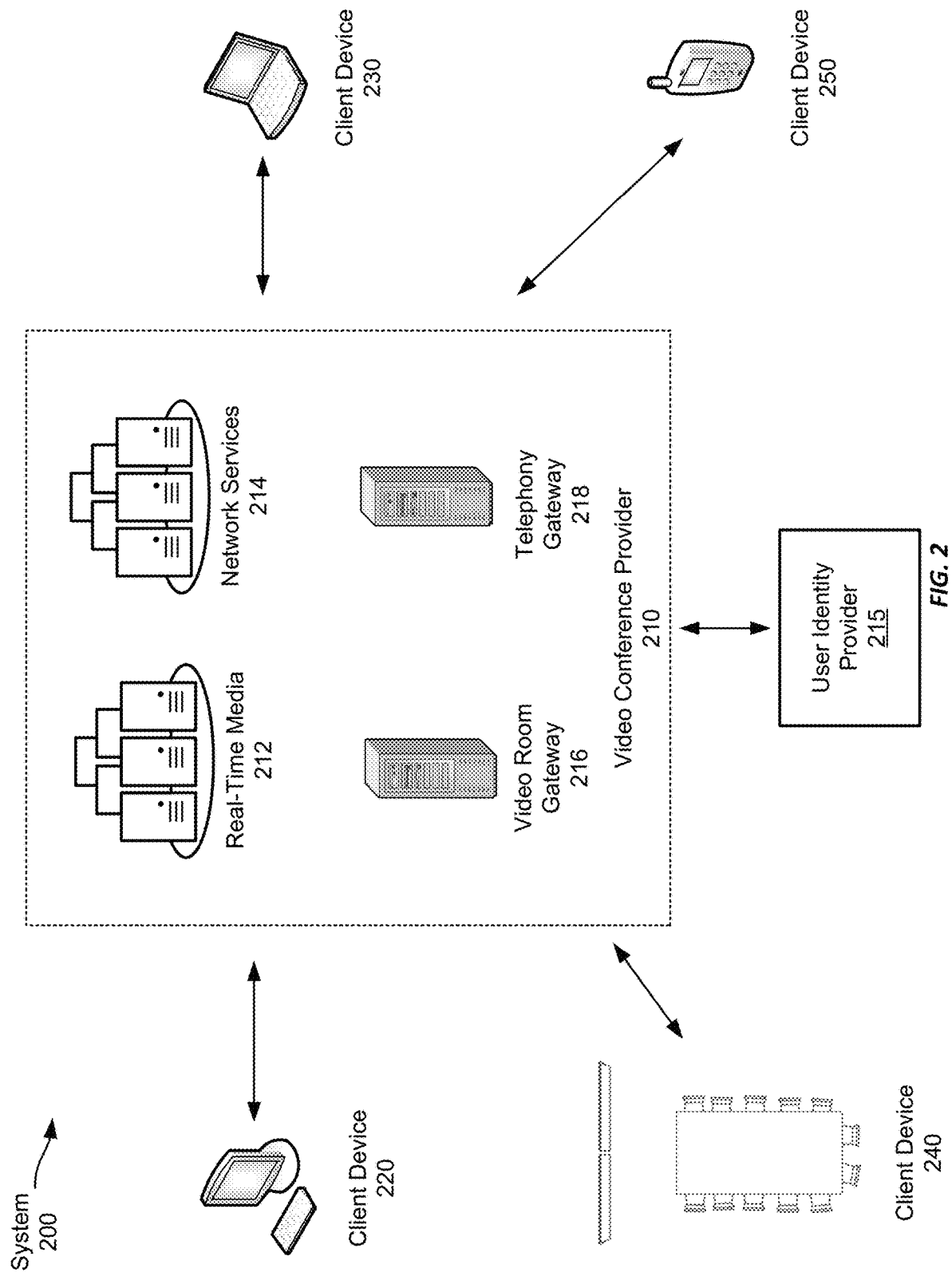

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
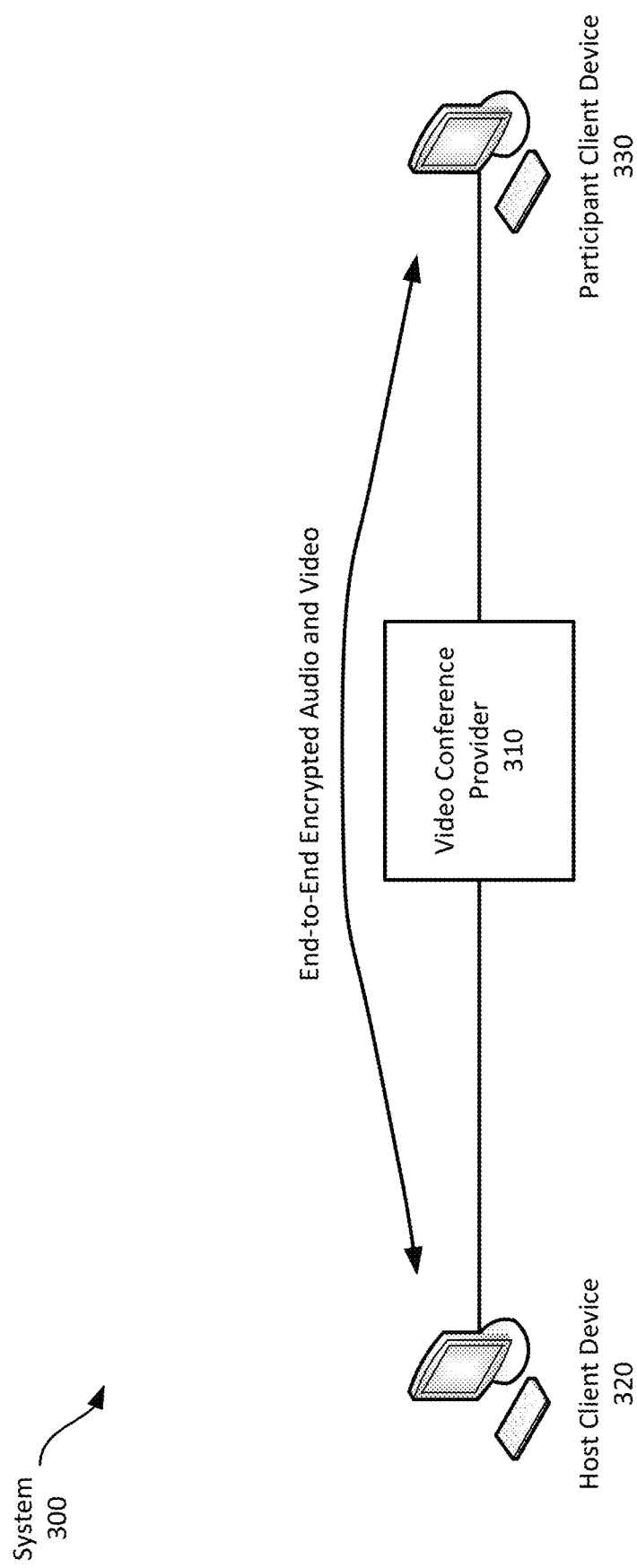

Referring now to FIG. 3, FIG. 3 illustrates a simplified system 300 that enables the users to engage in an E2E-encrypted video conference. The system includes two client devices 320, 330 and a video conference provider 310. The client devices 320, 330 are connected to the video conference provider 310 through one or more communication networks (not shown), generally as described above with respect to FIGS. 1 and 2.

In an E2E-encrypted video conference, each participant joins the video conference with their respective client device 320-330 and the host establishes a meeting key, e.g., a symmetric cryptographic key, that will be used to encrypt and decrypt the audio and video streams. Each of the participants also has their own respective public/private key pair that can be used to communicate with the respective participant and each participant's public key is published or distributed in any suitable manner, such as by registering it with a trusted entity or by generating a cryptographic signature using a private key and allowing the host or other participants to use a published copy of the public key to verify the signature.

Once each participant's public key has been verified, the host can securely distribute the meeting key to the participants by encrypting the meeting key using the participant's respective public keys. For example, the host may generate and send an encrypted message including the meeting key to each participant using the respective participant's public key. Upon receiving successfully decrypting the meeting key, the respective participants are then able to encrypt and decrypt meeting content.

In system 300 shown in FIG. 3, client device 320 initially connects to the video conference provider 310 and requests that the video conference provider create a new meeting. Once the meeting is created, client device 320 is designated as the host of the meeting and establishes a meeting key to use to provide for E2E encryption in the meeting, but does not provide it to the video conference provider 310. Subsequently, a participant client device 330 joins the meeting and generates and provides a cryptographically signed message using its private key to the host client device 320, which verifies the message using the participant's public key. After verifying the public key, the host client device 320 encrypts the meeting key using the participant's public key and transmits it to the participant client device 330, which decrypts the meeting key. Once the meeting key has been successfully received and decrypted by the participant client device 330, it may begin transmitting encrypted audio and video using the meeting key.

In this example, each participant generates a per-stream encryption key by computing a new key using a non-secret stream ID for each data stream it transmits (e.g., audio and video), and uses the corresponding stream encryption key to encrypt its audio and video stream(s). The video conference provider receives the various encrypted streams, multiplexes them generally as described above with respect to FIGS. 1 and 2, and distributes them to the various participating client devices 320, 330. The respective client devices 320, 330 can then use the meeting key to decrypt the incoming streams and view the content of the video conference.

However, as part of this process, the video conference provider 310 does not have access to the meeting key. Thus, the video conference provider 310 is unable to decrypt the various audio and video streams. But because the individual streams are separately received from the various participants, the video conference provider 310 is able to identify the source of each stream and therefore it can properly multiplex the streams for delivery to each participant. Thus, the participants are able to securely exchange multimedia streams using the video conference provider, without exposing the content of those streams to the video conference provider.

Figure 4:
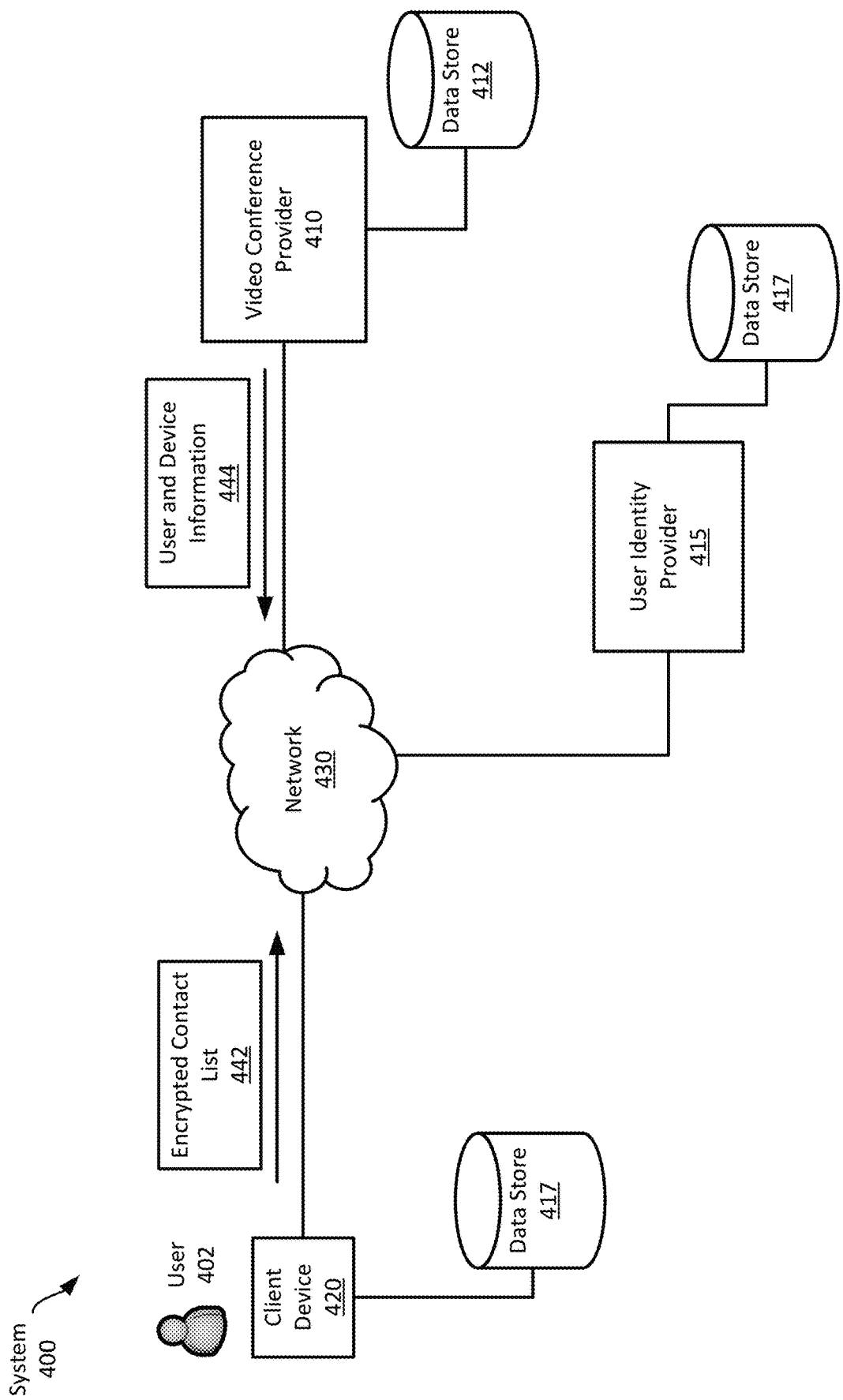

Referring now to FIG. 4, FIG. 4 shows an example system 400 for signed contact lists for user authentication in video conferences. In this example, the system 400 includes a client device 420 associated with a known user 402 and having a data store 422. In addition, the system 400 includes a video conference provider 410, having a corresponding data store 412, and a user identity provider 415 and its corresponding data store 417.

To create a contact list, the user's client device 420 may obtain information from the video conference provider 410 about other participants in a meeting. This information may include a portion of the other participants' signature chains. Signature chains are chains of data records that can be used to help authenticate a user's identity by another entity, such as by the video conference provider 410. Each entry in a signature chain records certain information about the particular user, such as the user's email address or username, information about client devices that have been authorized by the user, location information, etc. Over time, records in the signature chain can add new user devices, revoke existing user device (e.g., if the user sells the particular device), change user identification information (e.g., email addresses, user name information, etc.), etc. Thus, the signature chain can carry information that may be used to determine whether a person purporting to be a particular user is, in fact, that user. In addition, the signature chains can carry a history of various information, and changes to that information, for a particular user.

Further, entries in a signature chain may include cryptographic information designed to make the entries in the signature chain resistant to modification. For example, a signature chain may include entries that each have a record with a cryptographic hash value over the preceding entry in the chain. Thus, if a record in an entry is changed, the cryptographic hash value in the next entry will no longer match a hash value computed from the modified entry, indicating a modification has occurred. Thus, certain information about a user and their authorized client devices may be stored in the chain and, if the user uses an authorized device to access a meeting, an inspection of their signature chain can identify a record corresponding to the user and indicating that the device is authorized. This may give assurance that the user is who they say they are. However, participants in a video conference may not have access to other participants' full signature chain. Instead, they may only have able to access a most recent entry or a handful of recent or relevant entries (e.g., based on device ID), which may not include sufficient information to confirm their identity. Thus, users may maintain their own contact lists to help them recognize participants and identify potential impersonators.

In this example, the user 402 has a user account with the video conference provider 410 and another user account with the user identity provider 415, and can use either (or both) to help authenticate the user to third parties. In cases where the user 402 participates in video conferences facilitated by the video conference provider 410, the video conference provider 410 can help authenticate the user to other participants in a meeting, or it can communicate with the user identity provider 415 to do so, generally as discussed above with respect to FIGS. 1-2.

At some time, the user joins a meeting facilitated by the video conference provider. And, during the meeting, the user 402 encounters a new participant in a video conference and wants to update their contact list. To do so, the client device 420 receives user and device identification information 444 from the video conference provider 410 during the meeting. After the meeting ends, the client device 420 generates a new record for the user's contact list. For example, the new client device may generate a record having the following fields:

```
{
    "participantUserID":
    "participantDeviceID":
    "participantPublicKey":
    "mtgDate":
    "mtgTime":
    "numberOfMtgs":
    "meetingStatus":
    "participantSigChainTail":
    "signature":
}
```

The participantUserID field stores a unique identifier assigned to the new participant, such as by the video conference provider 410; however, it could include any suitable identifying information, such as an email address, a username, an identification number, etc. The participantDeviceID field stores an identifier for the participant's client device, which may be information that is uniquely assigned to the device, such as a serial number (and a model number, in some examples), an IMEI number, a network adapter (e.g., Ethernet) MAC address, etc. And while an IMEI may be portable, in that it may be moved to a different device via a SIM card, the IMEI in conjunction with other device identification information, e.g., a device serial number, may form a unique identifier for the device. Further, in some examples, the device identifier could be any identifier that is unique across all devices associated with the user identifier, e.g., an incrementing counter value or a random value. In some examples, using an anonymized value such as a counter or a random value may provide additional privacy for the user in contrast to a device identifier that may indirectly provide personal information about the user, such as an IMEI number or network address.

The participantPublicKey field stores the public key of a cryptographic key-pair associated with the participant. The user may receive this during an authentication process for an E2E-encrypted meeting, or the participant may publish this information during the meeting or as being associated with their identity. For example, as discussed above with respect to FIG. 3, the public key pair may be used during meeting key distribution in an E2E-encrypted meeting. The mtgDate and mtgTime fields store the meeting date and time that the user most recently encountered the participant, while the numberOfMtgs field indicates the number of times that the user has been in a meeting with the participant.

The participantSigChainTail field stores the last entry in the participant's signature chain, or the last m entries in that signature chain. The signature field stores a cryptographic signature for the user, such as an encrypted hash value over the fields in the record using a key from the user's own cryptographic key-pair. Thus, the signature can be used to verify to the user that the record is authentic and has not been modified.

Thus, in this example, the client device 420 generates a new record according to the format above and inserts the appropriate information into the corresponding fields of the record. In this example, the user inserts the user's identifier, e.g., the user's email address, and a device identifier (such as one of those mentioned above) of the participant's device used in the meeting. In addition, because this is the first time the user has encountered the participant in a meeting, it sets the numberOfMtgs field to 1. The client device 420 also generates a cryptographic signature over the field values in the record and stores the signature in the "signature" field. In this example, the SHA-256 hash function is used to generate the cryptographic hash value, but any other cryptographic hash function may be used, e.g., any SHA function, such as SHA-512.

Once the record has been generated, the client device 420 stores it in their device's data store 422. In some examples, however, it may transmit the contact list 442 (which may be encrypted, in some examples) to the video conference provider 410 so that it may be synchronized to other of the user's devices. In some examples, the user may maintain records in its contact list, or its entire contact list, at multiple locations, such as with user identity provider 415. However, to ensure the security of its contact list, the user's client device 420 may encrypt all of the records in the contact list using the user's cryptographic key pair. To encrypt the contact list, in this example, the user's client device 420 individually encrypts each record and then tags each record with a cryptographic identifier using the user's personal encryption keys. Thus, the user's client device 420 may only transmit encrypted copies of some or all the individual records in the contact list to the video conference provider 410 or the user identity provider 415.

It should be appreciated that the data fields in the example above are only examples and more or different data fields may be used in different examples. For example, while only one userID field is used in this example, other examples may include userName, userFirstName, userLastName, userEmailAddress, userPhoneNum, etc. fields to enable different types of user information to be stored. Similarly, because a user may employ multiple different devices over time or even in a single meeting, e.g., video from a webcam on a device and audio from a separate device (such as a telephone), a record may allow for multiple different deviceID fields over time or in a single meeting. Alternatively, the system may store multiple records for a single user, where each record corresponds to a different device.

Figure 5:
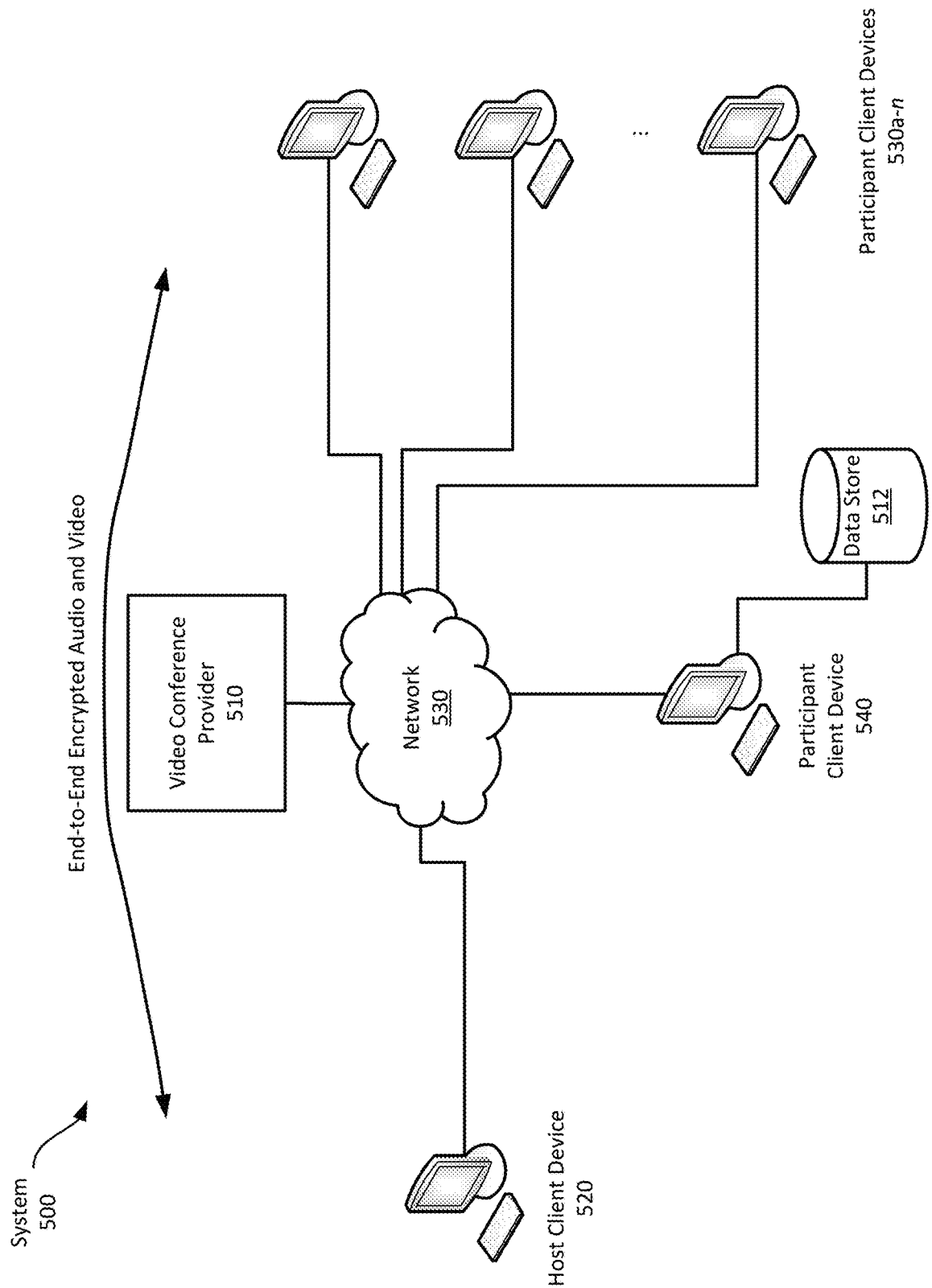

Referring now to FIG. 5, FIG. 5 shows an example system 500 for signed contact lists for user authentication in video conferences. The system includes a video conference provider 510 as well as a number of participant client devices 520, 530*a-n*, 540 that are connected to the video conference provider 510 via one or more networks 530. In this example, the host client device 520 has started a meeting via the video conference provider 510, and the participant client devices 530*a-n*, 540 have joined the meeting.

After joining the meeting, participant client device 540 accesses its contact list and attempts to authenticate the other participants in the meeting, i.e., the individuals using the host client device 520 and the participant client devices 530*a-n*. In this example, the user's participant client device 540 maintains a copy of its contact list in its data store 512, including records for various participants that it has encountered in the past.

Figure 6:
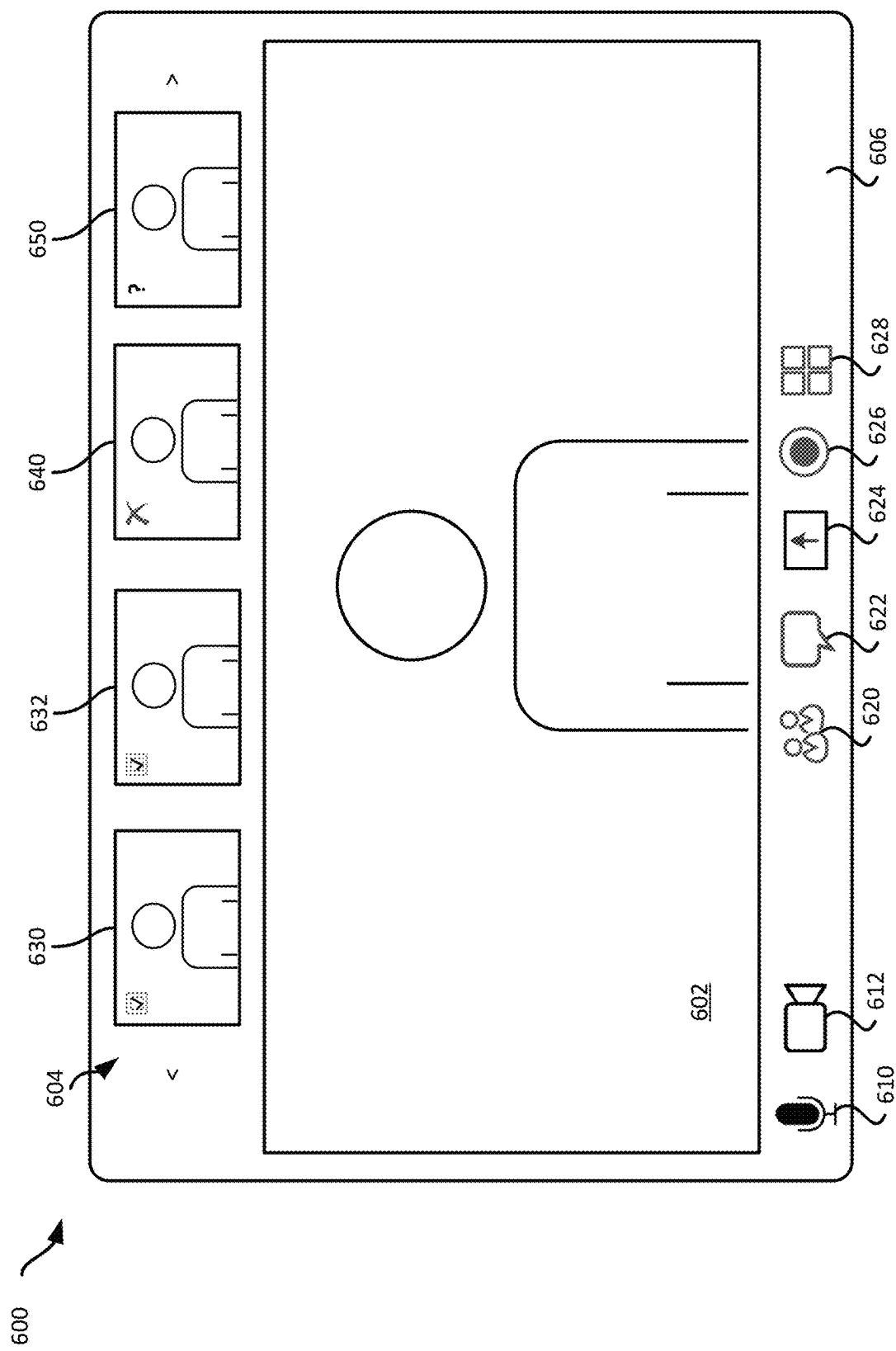
FIG. 6 shows an example GUI for signed contact lists for user authentication in video conferences.

First, the client device 540 receives user and device identification information about the host client device 520. In this example, because the meeting employs E2E-encryption, the client device 540 receives the user and device information from the host client device 520; however, in some examples, the client device 540 may receive the user and device information from the video conference provider 510. It then accesses its contact list and searches for a record corresponding to the participant's user information, e.g., includes the same email address, user name, or other user identifier. In this example, the client device 540 has previously encountered the participant using the host client device 520 and thus, it locates a corresponding record. It checks both the user identification information against the userID or other related fields as well as the device identification information against the deviceID. In this case the client device 540 determines that the received user identification information and device identification match an existing record corresponding to the participant. As a result, the client device 540 is able to verify the identity of the participant and, in this example, it notifies the user by presenting a verification icon overlaid on the participant's video feed, such as shown in FIG. 6 and described below.

Next the client device 540 receives user and device identification information about another participant client device, e.g., client device 530*a*. However, in this case, when the client device 540 accesses its contact list, it does not locate any record corresponding to the user or the device. Consequently, the client device 540 is unable to verify the user or the device; however, because it lacks information about the user and the device, it notifies the user that the user and device are not recognized by overlaying a "?" on the participant's video feed, as shown in FIG. 6.

The client device 540 also receives user and device identification information about a third participant client device, e.g., client device 530*b*. In this case, the client device 540 accesses the contact list and identifies a record corresponding to the user identification information; however, the record does not reflect a device matching the device identification information. Thus, the client device 540 is unable to verify the user and the device. Because the client device 540 has identified a record for the user, but cannot verify the device, it flags the participant as a potential impersonator. In this example, the client device 540 presents an "X" icon overlaid on the participant's video feed to indicate that the participant may be an impersonator.

In some examples, the client device 540 may request signature chain information from the video conference provider 510 corresponding to the participant. In response, the video conference provider 510 responds by providing at least a portion of the participant's signature chain. For example, the client device 520 may provide user identification information as well as the device identification information for the device 530*b*. The video conference provider 510 may provide one or more entries corresponding to the participant's signature chain and which either include a deviceID corresponding to the device identification information and indicating that the device is a known device for the user, or a subsequent record to enable verification of the record. If no record or no signature chain is identified, the video conference provider 510 may instead respond accordingly. If no signature chain is returned, the client device 540 may retain the overlaid "X" icon or may change it to a "?" to indicate that it cannot confirm whether the participant is authentic. If the signature chain is returned and a record indicates that the device is an authorized device for the participant, the client device 540 may change the "X" icon to a check mark. However, if the signature chain lacks a record corresponding to the device identification information, or includes a record indicating that the device is no longer authorized, the client device 540 may retain the "X" icon overlaid on the participant's video feed.

Thus, the system 500 allows the user to authenticate other participants in the meeting and to provide notifications to the user as to whether the participants are recognized or are potential imposters.

Referring now to FIG. 6, FIG. 6 shows an example GUI for video conference software that may be executed by one or more client devices according to this disclosure. In this example, the GUI 600 includes a speaker view window 602 that presents the current speaker in the meeting. Above the speaker view window 602 are smaller participant windows 604, which allow the user to view other participants in the main meeting, as well as controls ("<" and ">") to let the user scroll to view other participants in the meeting.

Beneath the speaker view window 602 are a number of interactive elements 610-628 to allow the host to interact with the video conference software. Controls 610-612 may allow the host to toggle on or off audio or video streams captured by a microphone or camera connected to the host client device 540. Control 620 allows the participant to view any other participants in the meeting with the user, while control 622 allows the user to send text messages to other participants, whether to specific participants or to the entire meeting. Control 624 allows the user to share content from their client device. Control 626 allows the user to toggle recording of the meeting, and control 628 allows the user to select an option to join a breakout room.

In this example, the client device 540, using the video conference software, has determined that two participants are authentic based on the user's contact list. As is shown in FIG. 6, each of participant windows 630, 632 has a check mark overlaid on the respective participant's video feed indicating that the participant has been authenticated. In contrast, the client device 540 was unable to authenticate participant 640 due to a conflict between user and device identification information received from the participant's client device 530*b* and information stored in the user's contact list. Thus, the video conference software has overlaid an "X" on the participant's video feed. Finally, the video conference software was unable to find any information in the contact list corresponding to the participant in participant window 650, and thus a "?" is overlaid on the participant window 650. And while these specific visual indicators were used in this example, in other examples different indicators may be employed. For example, participant windows may have colored borders indicating the status of the corresponding participants, e.g., green corresponding to an authenticated participant, red corresponding to a potential impersonator, and yellow indicating an unknown participant. Further, some examples, may output audible notifications if a potential impersonator is identified.

Figure 7:
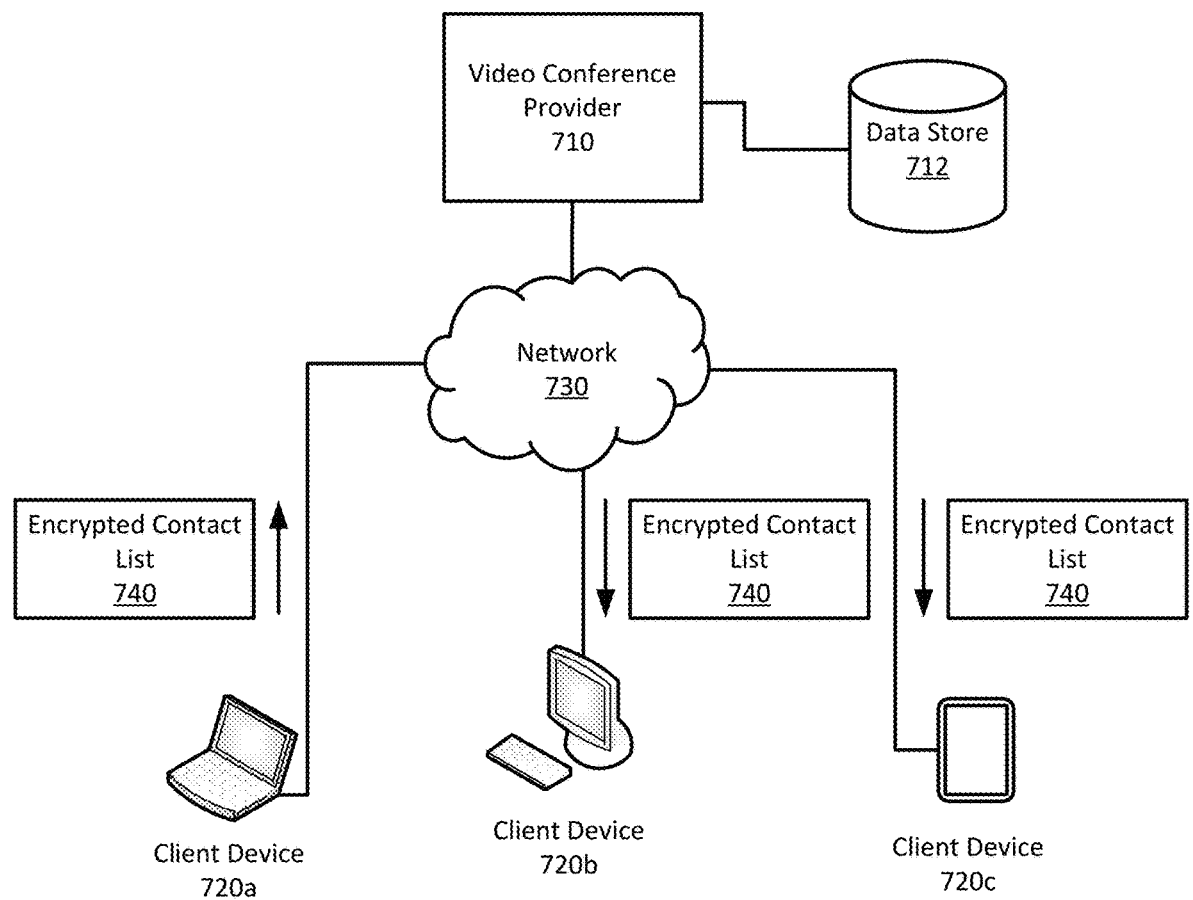
FIG. 7 shows an example system for signed contact lists for user authentication in video conferences.

Referring now to FIG. 7, FIG. 7 shows an example system 700 for signed contact lists for user authentication in video conferences. The example system 700 includes multiple client device 720*a-c* all owned by the same individual and used to access video conferences facilitated by the video conference provider 710, such as over network 730. In this example, the user has been primarily using client device 720*a* to access meetings via the video conference provider 710, but has recently purchased a new tablet device 720*c* and also needs to use their desktop device 720*b* for a meeting. However, the user wishes to continue authenticating other participants and to grow their contact list as they encounter new participants, regardless of the client device 720*a-c* they use.

Thus, the user connects to the video conference provider 710 using client device 720*a* and accesses their user account by providing their access information, e.g., a username and password. The user then selects an option to synchronize their contact list with the video conference provider 710. The client device 720*a* accesses the contact list, which is encrypted and stored on the client device. In this example, the contact list is encrypted using the user's own cryptographic key-pair. The client device 720*a* then transmits the encrypted contact list 740 to the video conference provider 710, which stores it in a data store 712 and associates it with the user's account.

The user then uses client device 720*b* to access their account at the video conference provider 710 any selects an option to authorize the client device 720*b* for their account and to automatically synchronize the encrypted contact list 740 with the client device 720*b*. The video conference provider 710 adds the device to the user's signature chain and updates an internal setting to synchronize the encrypted contact list with the client device 720*b* when it logs into the user account. It then sends a request to the client device 720*b* requesting a hash value of the version of the contact list the client device 720*b* already has. If the client device 720 has a copy of the contact list, it computes a hash value (e.g., using any suitable hashing technique, such as SHA-256) and provides it to the video conference provider 710. The video conference provider 710 also computes a hash value using the same hashing technique and compares its generated hash value with the hash value received from the client device 720*b*. If they differ, the video conference provider 710 transmits the encrypted contact list 740 to the client device 720*b*. Otherwise, it determines the two contact lists are the same and no update is needed. At a later time, the user may also access their account using client device 720*c* and perform the same process, thereby synchronizing the encrypted contact list 740 to the client device 720*c* as well. Thus, going forward, as the user attends more meetings with any of the client devices 720*a-c* and adds information to the contact list, it may be automatically synchronized with the other devices 720*a-c* the next time they are used to access the video conference provider 710.

Figure 8:
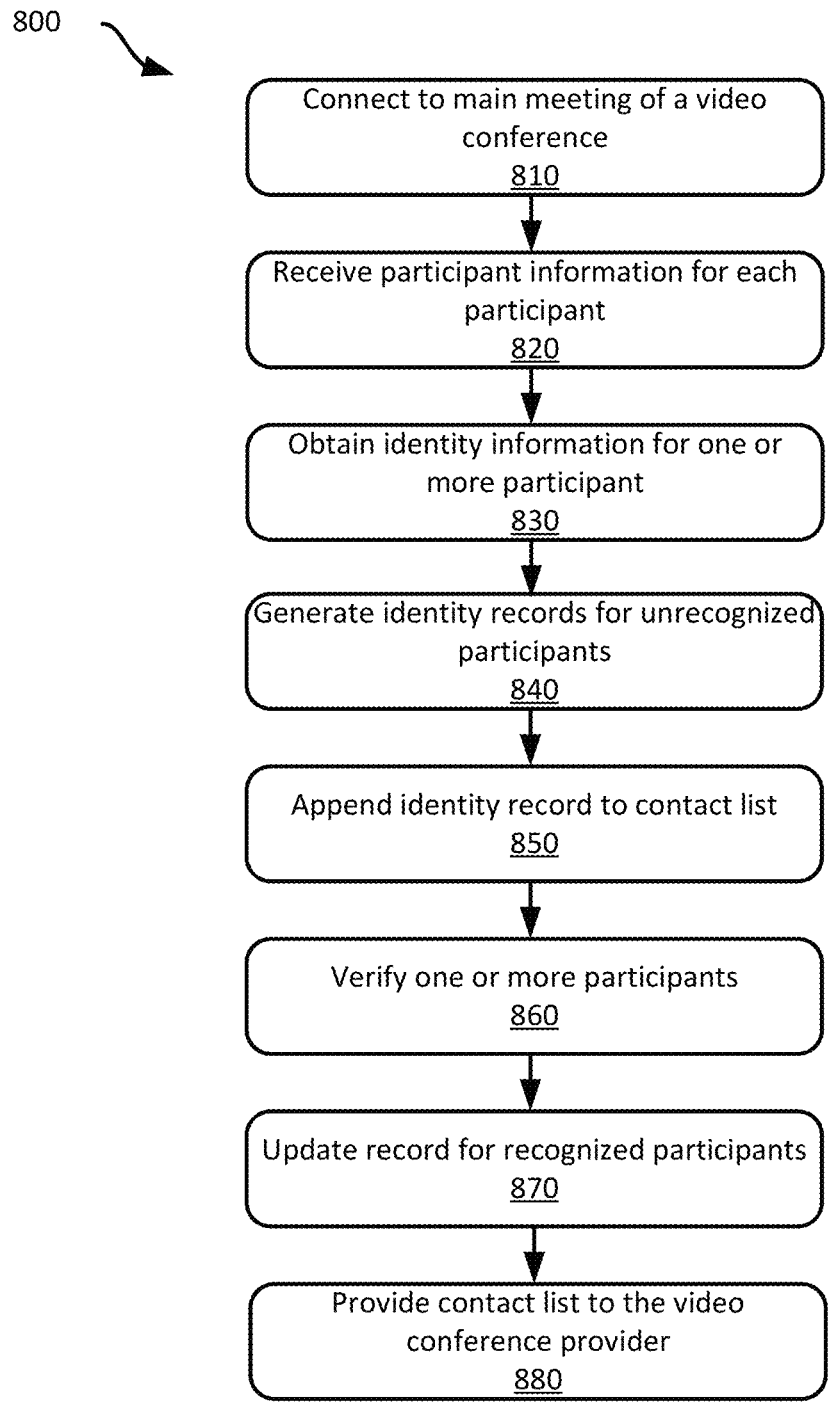
FIG. 8 shows an example method for signed contact lists for user authentication in video conferences.

Referring now to FIG. 8, FIG. 8 shows an example method 800 for signed contact lists for user authentication in video conferences. This example method 800 will be discussed with respect to the example system 500 shown in FIG. 5; however, any suitable system according to this disclosure may be employed according to various examples, including the systems 100-400, 700 shown in FIGS. 1-4 and 7.

At block 810, the participant client device 540 connects to a video conference hosted by a video conference provider 510 via one or more networks 530 by providing meeting identification information, such as a meeting identifier and passcode, or generally as discussed above with respect to FIGS. 1-3. In this example, the video conference employs E2E encryption; however, E2E encryption is not required.

At block 820, the participant client device 540 receives participant information for each participant in the video conference. The participant information may be received from the video conference provider 510 or from the respective participant client device 530*a-n*. Participant information may include a name (e.g., a first or last name, an initial, etc.), a user identifier (e.g., an email address, a telephone number, a username, etc.), a device identifier (e.g., a serial number (and a model number, in some examples), an IMEI number, a telephone number, a network adapter (e.g., Ethernet) MAC address, etc.), a network address (e.g., an internet protocol ("IP") address), a location (e.g., a latitude and longitude, an address, etc.), etc. The information may be provided by the respective client device 530*a-n* or by the video conference provider 510, or by a combination of the two. In some examples, users may select which information they are willing to share, which may limit the types of participant information that may be received in some examples.

At block 830, the participant client device 540 obtains identity information from one or more of the participants. In this example, the participant client device 540 obtains at least a portion of a signature chain associated with one or more of the participants. For example, the participant client device 540 may obtain the latest record for one or more of the participants. The participants' signature chains may include verified information about the respective participant, such as device information, user information, etc., that can be used to authenticate the participant during the video conference.

In some examples, the participant client device 540 may request specific records from another participant's signature chain, such as any records relating to the client device 530*a-n* being used by the participant or any records relating to the user information (e.g., user name, email address, etc.) used by the participant. The request may be sent to the video conference provider 510 or to the participant's client device 530*a-n*, which may then respond with the requested records or with other records that may be used to verify records responsive to the request.

It should be appreciated that the functionality at block 530 may be optional in some examples. While signature chain information may be useful to provide a more reliable verification of a user's identity, in some examples, a user's contact list may become robust enough that it can verify a user's identity without reference to the particular user's signature chain, or at least provide a sufficiently high confidence of verification for a particular setting. For example, a meeting involving highly confidential information may involve the use of a signature chain, while a social meeting may rely solely on a user contact list to confirm the identities of other participants.

At block 840, the participant client device 540 generates an identity record for one or more of the participants. In this example, the participant client device 540 determines which of the other participants are already present within its contact list and, for those that are not found in the contact list (i.e., they are "unknown" or "unrecognized"), an identity record is created. In this example, the identity records have the following format, which fields are described above with respect to FIG. 4:

```
{
    "participantUserID":
    "participantDeviceID":
    "participantPublicKey":
    "mtgDate":
    "mtgTime":
    "numberOfMtgs":
    "participantSigChainTail":
    "signature":
}
```

The participant client device 540 fills each field based on the participant information received at block 820 and, optionally, the identity information received at block 830. In addition, the participant client device 540 generates a cryptographic signature based on the user's own cryptographic key pair and inserts the signature into the "signature" field. In this example, the signature is also based on the meeting date and time, whereby the participant client device encrypts the mtgDate and mtgTime using the user's private key of the key pair. In some examples, the cryptographic signature may be generated according to any suitable technique.

While in this example, the participant client device 540 only generates a new record for unrecognized participants, in some example the participant client device 540 may generate a new record for every participant in the meeting, whether recognized or not (or without determining whether the other participants are recognized or not). Thus, in some examples, a contact list may include multiple records corresponding to the same participant. In one such example, the record may include slightly different fields, such as the following:

```
{
    "participantUserID":
    "participantDeviceID":
    "participantPublicKey":
    "mtgDate":
    "mtgTime":
    "mtgStatus":
    "participantSigChainTail":
    "signature":
}
```

The fields in this example reflect that each record references only a single meeting, indicated by the mtgDate and mtgTime fields. In addition, the record includes a mtgStatus field, which indicates whether the meeting completed normally, whether the participant corresponding to the record was removed from the meeting, whether there was a question about the authenticity of the participant, whether the participant is banned from future meetings, or any other suitable meeting status information.

At block 850, the participant client device 540 appends the one or more new identity records to its contact list. In this example, the participant client device 540 maintains its contact list in a local data store and appends the new records. However, in some examples the participant client device 540 may maintain its contact list remotely, e.g., at the video conference provider 510. In one such example, the participant client device 540 transmits the new record(s) to the video conference provider 510 with an instruction to append the records to the user's contact list.

At block 860, the participant client device 540 verifies one or more participants in the video conference based on the contact list. To verify a participant in this example, the participant client device 540 compares the participant information and, optionally, the identity information received at blocks 820 and 830 with records in the user's contact list. If a participant is recognized, meaning one or more records in the contact list appear to correspond to the participant, the participant client device 540 can then examine the fields within the record(s) and compare the information in the fields with the received participant information and, optionally, the identity information. If the information matches, the participant client device 540 may determine that the participant is likely the same participant that had been encountered previously. In addition, the participant client device 540 may examine other fields in the identified record(s) to determine a meeting history between the user and the participant, such as based on the numberOfMtgs, the latest recorded meeting date and time, or, if the contact list uses one record per encounter with a participant, the number of times the participant has been encountered and corresponding mtgStatus field(s).

Based on the meeting history, the participant client device 540 may verify the participant, such as by presenting the check mark in the participant's video feed as shown in FIG. 6 and discussed above, or by presenting a text message to the user indicating that the participant is recognized or verified. In some examples, if the user is not recognized or if past mtgStatus information indicates that the user has been disruptive or has been removed past meetings, the participant client device 540 may display an "X" on the participant's video feed, such as is shown in FIG. 6, or it may present an option to remove a user. Further, some examples may automatically remove participants from meetings if a past meeting status indicates that the participant is banned, is known to be compromised, etc.

In some examples, the participant client device 540 may provide other information about participants in the meeting based on the contact list. For example, if the user is encountering a participant for the first time in a meeting (based on the contact list), the participant client device 540 may display a message over the participant's video feed indicating this is the first time encountering this participant. It may also request confirmation from the user as to whether the user can confirm the participant is who they say they are. In one example, if the user verifies the participant, a meeting status field (or other suitable field, e.g., userVerified) may be updated to indicate that the participant has been positively verified by the user during the meeting.

At block 870, the participant client device 540 updates records corresponding to one or more participants. As discussed above, some examples may employ a single record in a contact list per participant. Thus, any updates to the participant's record may be made in the existing record, such as to update a numberOfMtgs field or a meetingStatus field. In some examples, if a new record is created for a participant, whether because the participant had not been previously encountered or because the contact list employs one record per encounter with a participant, the record may be created at block 840 and subsequently updated during the meeting, e.g., if the participant is removed or disruptive, or at the end of the meeting, e.g., to indicate the mtgStatus is normal or the participant is recognized.

At block 880, the participant client device 540 provides the contact list to the video conference provider 510. In this example, and as generally described with respect to FIG. 7, the user synchronizes their contact list with the video conference provider 510. Before providing the contact list to the video conference provider 510, the participant client device 540 encrypts the contact list using the user's public key. It then sends the updated contact list to the video conference provider 510, which stores the encrypted contact list in its data store 512. At a later time, it may provide the encrypted contact list to the user at a different client device.

The example method 800 discussed above employs certain functionality occurring in a particular order. However, it should be appreciated that different blocks may occur in different orders than depicted in FIG. 8 or described above. For example, blocks 830-870 may occur in any suitable ordering. Further, while the method was described as being performed by the participant client device 540, it should be appreciated that any suitable computing device may perform example methods according to this disclosure, including one or more computing devices operated by the video conference provider 510.

Figure 9:
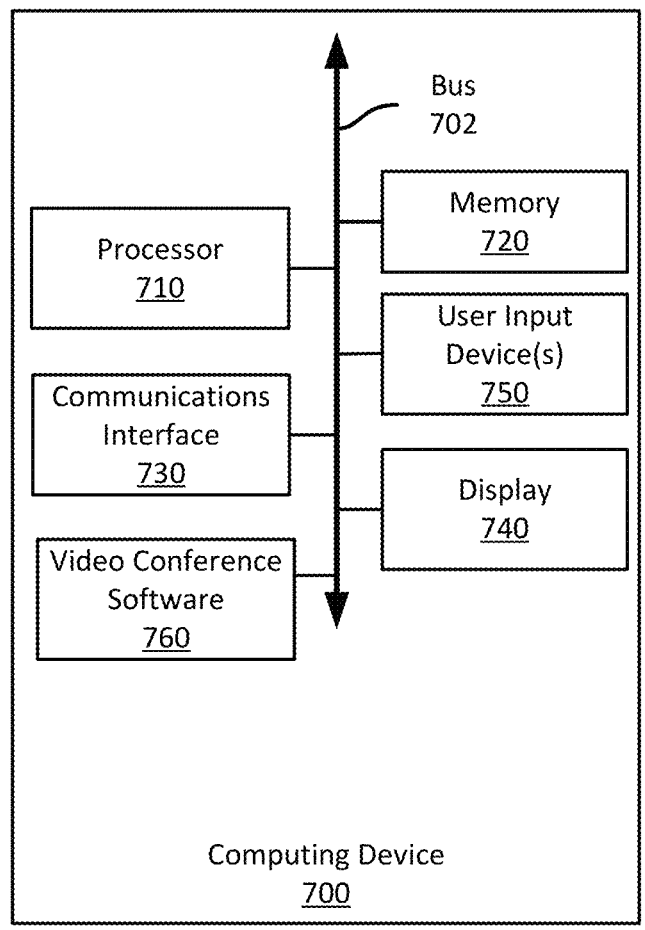
FIG. 9 shows an example computing device suitable for use with systems and methods for signed contact lists for user authentication in video conferences.

Referring now to FIG. 9, FIG. 9 shows an example computing device 900 suitable for use in example systems or methods for hiding private user data in public signature chains for user authentication in video conferences according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for signed contact lists for user authentication in video conferences according to different examples, such as part or all of the example methods 400-600 described above with respect to FIGS. 4-6. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes video conference software 960 to enable a user to join and participate in a video conference, such as a conventional meeting or webinar, by receiving multimedia streams from a video conference provider, sending multimedia streams to the video conference provider, joining and leaving breakout rooms, such as described throughout this disclosure, etc.

The computing device 900 also includes a communications interface 940. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
    establishing, by a video conference provider a video conference for a plurality of participants, each participant using a respective client device;
    receiving, by the video conference provider for one or more of the participants, participant information for each participant of the plurality of participants;
    generating, by the video conference provider for one or more of the participants, an identity record corresponding to the respective participant, the identity record including video conference information, at least a portion of the participant information, and a cryptographic signature;
    appending, by the video conference provider for each generated identity record, the respective identity record to a user contact list; and
    verifying, by the video conference provider, at least one participant of the plurality of participants based on the user contact list.

2. The method of claim 1, further comprising:
    obtaining identity information for one or more participants of the plurality of participants based on the respective participant information; and wherein generating the identity record for the respective participant further includes at least a portion of the identity information.

3. The method of claim 1, wherein a first participant is participating in the video conference using a first client device, and further comprising:
    transmitting a request to the first client device for participant confirmation of a second participant;
    receiving a response to the request from the first client device; and
    updating the user contact list based on the response.

4. The method of claim 3, further comprising:
    in response to the response indicating that the second participant is not confirmed, disconnecting the second participant from the video conference, and
    wherein updating the user contact list includes adding an indication that the second participant was removed from the video conference.

5. The method of claim 1, wherein a first participant is associated with a first client device, and further comprising:
    receiving a request from a second client device associated with the first participant to synchronize the user contact list; and
    in response to verifying the second client device is associated with the first participant, synchronizing the user contact list to the second client device.

6. The method of claim 1, further comprising:
    receiving, by the video conference provider from a user identity provider, user identity information associated with one or more participants of the plurality of participants; and
    wherein generating the respective identity record is based on at least a portion of the user identity information.

7. The method of claim 1, wherein the cryptographic signature is based on a prior record in the user contact list.

8. The method of claim 1, wherein the participant information includes client device information for each participant of the plurality of participants, and wherein the respective identity record includes the respective client device information.

9. The method of claim 1, wherein a first participant is participating in the video conference using a first client device, and further comprising:
receiving an indication from the first client device that a participant of the plurality of participants is an imposter;
removing the participant from the video conference; and
updating the user contact list based on the indication.

10. The method of claim 1, further comprising, for each participant of the plurality of participants:
appending, by the video conference provider for each generated identity record, the respective identity record to a respective user contact list for each participant of the plurality of participants; and
verifying, by the video conference provider, each participant of the plurality of participants based on the user contact lists.

11. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
establish a video conference for a plurality of participants, each participant using a respective client device;
receive participant information for each participant of the plurality of participants;
generate, for one or more of the participants, an identity record corresponding to the respective participant, the identity record including video conference information, at least a portion of the participant information, and a cryptographic signature;
append, for each generated identity record, the respective identity record to a first user contact list for a first participant of the plurality of participants; and
verify at least one participant of the plurality of participants based on the first user contact list.

12. The system of claim 11, wherein the one or more processors are configured to execute further processor-executable instructions stored in the non-transitory computer-readable medium to:
obtain identity information for one or more participants of the plurality of participants based on the respective participant information; and wherein generating the identity record for the respective participant further includes at least a portion of the identity information.

13. The system of claim 11, wherein a first participant is associated with a first client device, and wherein the one or more processors are configured to execute further processor-executable instructions stored in the non-transitory computer-readable medium to:
receive a request from a second client device associated with the first participant to synchronize the first user contact list; and
in response to verifying the second client device is associated with the first participant, synchronize the first user contact list to the second client device.

14. The system of claim 11, wherein the one or more processors are configured to execute further processor-executable instructions stored in the non-transitory computer-readable medium to:
receive, from a user identity provider, user identity information associated with one or more participants of the plurality of participants; and
wherein generation of the respective identity record is based on at least a portion of the user identity information.

15. The system of claim 11, wherein the first participant is participating in the video conference using a first client device, and wherein the one or more processors are configured to execute further processor-executable instructions stored in the non-transitory computer-readable medium to:
receive an indication from the first client device that a participant of the plurality of participants is an imposter;
remove the participant from the video conference; and
update the first user contact list based on the indication.

16. The system of claim 11, wherein the one or more processors are configured to execute further processor-executable instructions stored in the non-transitory computer-readable medium to, for each participant of the plurality of participants:
append, for each generated identity record, the respective identity record to a respective user contact list for each participant of the plurality of participants; and
verify each participant of the plurality of participants based on the user contact lists.

17. A non-transitory computer-readable medium comprising processor-executable instructions configured to cause one or more processors to:
establish a video conference for a plurality of participants, each participant using a respective client device;
receive participant information for each participant of the plurality of participants;
generate, for one or more of the participants, an identity record corresponding to the respective participant, the identity record including video conference information, at least a portion of the participant information, and a cryptographic signature;
append, for each generated identity record, the respective identity record to a first user contact list for a first participant of the plurality of participants; and
verify at least one participant of the plurality of participants based on the first user contact list.

18. The non-transitory computer-readable medium of claim 17, wherein a first participant is associated with a first client device, and further comprising processor-executable instructions configured to cause one or more processors to:
receive a request from a second client device associated with the first participant to synchronize the first user contact list; and
in response to verifying the second client device is associated with the first participant, synchronize the first user contact list to the second client device.

19. The non-transitory computer-readable medium of claim 17, further comprising processor-executable instructions configured to cause one or more processors to:
receive, from a user identity provider, user identity information associated with one or more participants of the plurality of participants; and
wherein generation of the respective identity record is based on at least a portion of the user identity information.

20. The non-transitory computer-readable medium of claim 17, wherein the first participant is participating in the video conference using a first client device and further comprising processor-executable instructions configured to cause one or more processors to:
- receive an indication from the first client device that a participant of the plurality of participants is an imposter;
- remove the participant from the video conference; and
- update the first user contact list based on the indication.

* * * * *